(12) United States Patent
Trang et al.

(10) Patent No.: US 12,207,168 B2
(45) Date of Patent: Jan. 21, 2025

(54) POWER MANAGEMENT OF MOVABLE EDGE COMPUTING SERVERS

(71) Applicant: SONY GROUP CORPORATION, Tokyo (JP)

(72) Inventors: Linh Trang, Åkarp (SE); Basuki Priyanto, Lund (SE); Rickard Ljung, Helsingborg (SE)

(73) Assignee: Sony Group Corporation, Tokyo (JP)

( * ) Notice: Subject to any disclaimer, the term of this patent is extended or adjusted under 35 U.S.C. 154(b) by 313 days.

(21) Appl. No.: 17/435,689

(22) PCT Filed: Apr. 2, 2020

(86) PCT No.: PCT/EP2020/059367
§ 371 (c)(1),
(2) Date: Sep. 1, 2021

(87) PCT Pub. No.: WO2020/212151
PCT Pub. Date: Oct. 22, 2020

(65) Prior Publication Data
US 2022/0256320 A1 Aug. 11, 2022

(30) Foreign Application Priority Data
Apr. 17, 2019 (SE) .................................. 1950478-6

(51) Int. Cl.
*H04W 4/44* (2018.01)
*G06F 1/26* (2006.01)
*H04W 4/02* (2018.01)

(52) U.S. Cl.
CPC .............. *H04W 4/44* (2018.02); *G06F 1/26* (2013.01); *H04W 4/023* (2013.01)

(58) Field of Classification Search
CPC ............ H04W 4/44; H04W 4/023; G06F 1/26
(Continued)

(56) References Cited

U.S. PATENT DOCUMENTS

| 4,970,718 A | * | 11/1990 | Simcoe | ...................... H04L 9/40 |
| | | | | 714/704 |
| 5,019,996 A | * | 5/1991 | Lee | ........................... G06F 1/30 |
| | | | | 713/340 |

(Continued)

FOREIGN PATENT DOCUMENTS

| CN | 107197034 A | 9/2017 |
| CN | 107241767 A | 10/2017 |

(Continued)

OTHER PUBLICATIONS

International Search Report and Written Opinion from corresponding International Application No. PCT/EP2020/059367, Jun. 30, 2020, 10 pages.

(Continued)

*Primary Examiner* — Paul R. Myers
(74) *Attorney, Agent, or Firm* — Tucker Ellis LLP

(57) ABSTRACT

A method for controlling operation of a mobile first Edge Computing, EC, server (220) configured to provide compute resources to User Equipment, UE, (303), wherein the first EC server is connected to an EC management entity (300) configured to manage a plurality of EC servers (220, 220-2), the method being carried out in the first EC server and comprising receiving (501) status information associated with the first EC server from an external entity; receiving (500,503) control information from the EC management entity, said control information identifying a power state control instruction; determining (504) a power state triggering event in accordance with the power state control instruction, based on the received status information; controlling (506) the power state of the first EC server responsive to the determined power state triggering event.

17 Claims, 5 Drawing Sheets

(58) Field of Classification Search
USPC .................................................. 713/300–340
See application file for complete search history.

(56) References Cited

U.S. PATENT DOCUMENTS

| | | | | |
|---|---|---|---|---|
| 6,546,425 | B1* | 4/2003 | Hanson | H04L 1/188 709/227 |
| 6,801,196 | B1* | 10/2004 | Bodley | G06F 1/3265 345/204 |
| 10,467,893 | B1* | 11/2019 | Soryal | H04L 67/52 |
| 10,636,305 | B1* | 4/2020 | Schmidt | G08G 1/143 |
| 2002/0004915 | A1* | 1/2002 | Fung | G06F 1/3221 713/320 |
| 2003/0233328 | A1 | 12/2003 | Scott | |
| 2004/0003303 | A1* | 1/2004 | Oehler | G06F 1/329 713/300 |
| 2004/0135824 | A1* | 7/2004 | Fitzmaurice | G06F 3/0488 715/856 |
| 2004/0148289 | A1* | 7/2004 | Bamford | G06F 16/2379 |
| 2005/0197118 | A1* | 9/2005 | Mitchell | H04W 48/14 455/434 |
| 2005/0203682 | A1* | 9/2005 | Omino | H04L 67/04 701/24 |
| 2007/0171047 | A1* | 7/2007 | Goodman | G01S 5/0072 340/539.13 |
| 2008/0055058 | A1* | 3/2008 | Nishiyama | B60L 53/65 370/310 |
| 2008/0287129 | A1* | 11/2008 | Somasundaram | H04W 36/0007 455/436 |
| 2009/0059823 | A1* | 3/2009 | Bolduc | H04W 4/029 370/310 |
| 2009/0258641 | A1* | 10/2009 | Yaqub | H04W 52/0251 455/574 |
| 2009/0315512 | A1* | 12/2009 | Ichikawa | B60L 53/305 320/109 |
| 2010/0268917 | A1* | 10/2010 | Nation | G06F 9/3869 713/323 |
| 2013/0338865 | A1* | 12/2013 | Kryze | B60L 50/20 701/22 |
| 2014/0082385 | A1* | 3/2014 | Reule | G06F 1/3296 713/320 |
| 2015/0212947 | A1* | 7/2015 | Henry | G06F 12/0864 711/119 |
| 2018/0041958 | A1 | 2/2018 | Narayanan | |
| 2018/0349203 | A1 | 12/2018 | Ohta | |
| 2019/0020657 | A1* | 1/2019 | Egner | H04L 9/3297 |
| 2019/0104475 | A1 | 4/2019 | Lukaszewski | |
| 2019/0158985 | A1* | 5/2019 | Dao | H04W 28/04 |
| 2019/0246252 | A1 | 8/2019 | Rasmusson | |
| 2020/0007410 | A1* | 1/2020 | Walsh | H04L 67/12 |
| 2020/0028783 | A1* | 1/2020 | Jin | H04W 8/04 |
| 2020/0106480 | A1* | 4/2020 | Mitchell | G01R 19/2513 |
| 2020/0229206 | A1* | 7/2020 | Badic | H04W 28/0226 |
| 2020/0252876 | A1 | 8/2020 | Yeon | |
| 2020/0404460 | A1* | 12/2020 | Prasad | H04W 24/08 |
| 2021/0035429 | A1* | 2/2021 | Daoura | H04W 4/80 |

FOREIGN PATENT DOCUMENTS

| | | |
|---|---|---|
| CN | 108463805 A | 8/2018 |
| CN | 108781389 A | 11/2018 |
| CN | 109479182 A | 3/2019 |
| EP | 3462787 A1 | 4/2019 |
| JP | 2018195175 A | 12/2018 |
| WO | WO-2017187011 A1 | 11/2017 |
| WO | WO-2018068863 A1 | 4/2018 |
| WO | WO-2018095537 A1 | 5/2018 |
| WO | WO-2019066582 A1 | 4/2019 |

OTHER PUBLICATIONS

Swedish Office Action and Search Report from corresponding Swedish Application No. 1950478-6, Nov. 12, 2019, 10 pages.
ETSI, "MEC002—A new requirement for energy management of MEC hosts," MEC(18)000379, Aug. 27, 2018, 3 pages.
ETSI, "Multi-access Edge Computing (MEC); Phase 2: Use Cases and Requirements," ETSI GE MEC 002 v2.1.1, Oct. 2018, 66 pages.
S. Wang, Cooperative edge computing with sleep control under nonuniform traffic in mobile edge networks, Oct. 15, 2018.
T. Rausch et al., "Portable Energy-Aware Cluster-Based Edge Computers," 2018-Third ACM/IEEE Symposium on Edge Computing, 2018, 13 pages.
L. Chen et al., "Energy Efficient Mobile Edge Computing in Dense Cellular Networks," IEEE ICC 2017 Green Communications Systems and Networks Symposium, 2017, 6 pages.
B. Yu et al., "U-MEC: Energy-Efficient Mobile Edge Computing for IoT Applications in Ultra Dense Networks," 2018, 13 pages.
S. Zhou et al., "Green Mobile Access Network with Dynamic Base Station Energy Saving," MobiCom'09, Sep. 20-25, 2009, 3 pages.

* cited by examiner

POWER MANAGEMENT OF MOVABLE EDGE COMPUTING SERVERS

TECHNICAL FIELD

The invention and its embodiments are related to the field of systems for providing Edge Computing (EC) resources in connection with communication networks, whereby computing power is made available to user equipment operating in communication with the communication network. More specifically, the invention relates to devices and methods for power management of movable edge computing servers.

BACKGROUND

The development of cloud-based services, operating to assist mobile devices with network-assisted storage and computing, is heavily increasing. Currently, ETSI (European Telecommunication Standards Institute) is promoting a new technology originally denoted Mobile Edge Computing (MEC), which is being standardized in an ETSI Industry Specification Group (ISG) of the same name. In the second phase of ETSI MEC ISG this is replaced by the term Multi-access Edge Computing, using the same acronym MEC, which also includes other types of access besides cellular, e.g. local area wireless connectivity such as wifi and also fixed networks.

MEC is a network architecture concept that enables cloud computing capabilities and an IT service environment at the edge of a communication network. MEC is the term used by ETSI for the concept mobile Edge Computing (EC). MEC allows applications to benefit from ultra-low latency and high bandwidth as well as real-time access to radio network information.

In an EC system, such as MEC, an EC host implemented in a server, also referred to as an EC server may be configured to execute an application for a user operating a client User Equipment (UE). Being an edge device, an EC server may typically be connected close to a communication access node, such as a cellular base station or a wifi access point.

In addition to providing such static EC servers, an EC system may include mobile EC servers. The concept of having a mobile EC server, such as a computing server located in a vehicle such as a car, train, drone etc., provides some challenges for power-efficient operation. In other words, energy efficiency will be a critical parameter, such that a power source associated with the EC server, typically a power source of the vehicle, is not unduly drained.

A suggestion for a solution to this problem has been provided in ETSI document MEC(18)000242, entitled "MEC002—Considerations for power management of MEC hosts". This document broadly suggests that MEC hosts are powered down when there are no MEC applications in service, basically meaning that they are turned off when not used. The MEC host may further be configured to wake up upon paging from remote services.

However, there is still room for improvement in the field of power management of mobile EC servers, such as MEC hosts, to provide more sophisticated and efficient energy reduction.

SUMMARY

MEC is the term used by ETSI, but other forms of Edge Computing architectures are plausible, such as proprietary systems. For these reasons, the more general term Edge Computing (EC) will predominantly be employed herein, while the term MEC will occasionally be used to illustrate such examples.

Solutions related to the problems associated with power management of mobile EC servers are set out in the claims.

In accordance with a first aspect, a method is provided for controlling operation of a mobile first Edge Computing (EC) server configured to provide compute resources to User Equipment (UE), wherein the first EC server is connected to an EC management entity configured to manage a plurality of EC servers, the method being carried out in the first EC server and comprising receiving status information associated with the first EC server from an external entity;

receiving (500,503) control information from the EC management entity, said control information identifying a power state control instruction;

determining a power state triggering event in accordance with the power state control instruction, based on the received status information;

controlling the power state of the first EC server responsive to the determined power state triggering event.

By means of this method, a mobile EC server may be effectively controlled to assume a certain state, or change state, based on relevant obtained information.

According to a second aspect, a method is provided, carried out in an EC management entity configured to manage a plurality of EC servers, for handling power states of at least a mobile first EC server, the method comprising transmitting a message to the mobile first EC server, wherein said message comprises control information identifying a power state control instruction, configured to identify a request for the first EC server to assume a predefined power state based on status information received in the mobile first EC server.

This way, a central function for controlling proper setting of power states in mobile EC servers is provided.

In accordance with further aspects, a mobile EC server, and an EC management entity, configured to operate in accordance with the steps of the first and second aspect, respectively, are provided.

Further embodiments are set out in the claims.

BRIEF DESCRIPTION OF THE DRAWINGS

Various embodiments will be outlined below with reference to the drawings, on which

DESCRIPTION OF EMBODIMENTS

Figure 1:
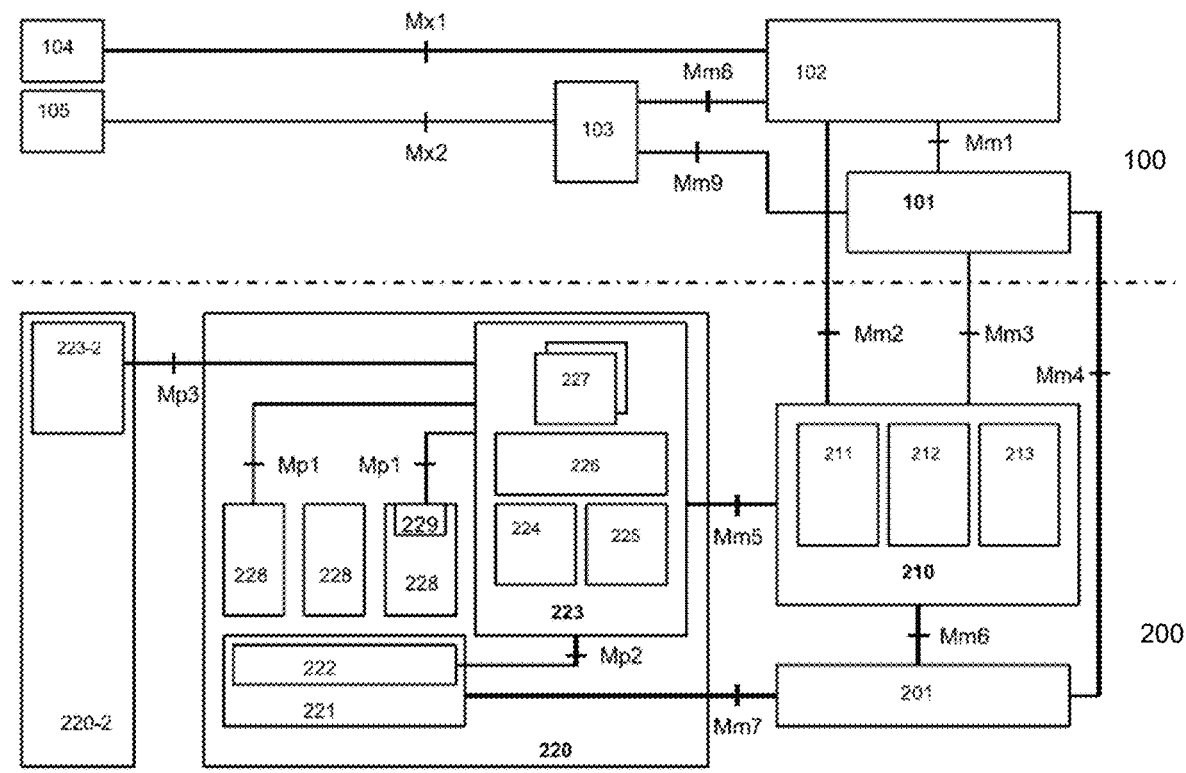
FIG. 1 illustrates an EC system according to one embodiment.

In the following description, for purposes of explanation and not limitation, details are set forth herein related to various embodiments. However, it will be apparent to those skilled in the art that the present invention may be practiced in other embodiments that depart from these specific details. In some instances, detailed descriptions of well-known devices, circuits, and methods are omitted so as not to obscure the description of the present invention with unnecessary detail. The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented and are thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions. In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Edge Computing (EC) is thought of as a natural development in the evolution of mobile radio stations and the convergence of IT and telecommunication networking. EC is based on a virtualized platform and will enable applications and services to be hosted 'on top' of mobile network elements, i.e. above the network layer. These applications and services can benefit from being in close proximity to the customer and from receiving local radio-network contextual information, e.g. in order to host such applications and services with a lower communication latency and with improved network information awareness than other solutions where the platform is located in other locations than in the close proximity. In general, the environment of EC is characterized by low latency, proximity, high bandwidth, and real-time insight into radio network information and location awareness, accomplished with EC servers hosting operator or 3rd party applications. As such, EC may enable new vertical business segments and services for consumers and enterprise customers. Frequently discussed use cases include video analytics, location services, Internet-of-Things (IoT), augmented reality, optimized local content distribution, data caching, mobile gaming, connected and controlled vehicle services etc. EC will allow software applications to tap into local content and real-time information about local-access network conditions. By deploying various services and caching content at the network edge, mobile core networks are alleviated of further congestion and can efficiently serve local purposes.

MEC is the term used by ETSI, but other forms of Edge Computing architectures are plausible, such as proprietary systems. For these reasons, the more general term Edge Computing (EC) will predominantly be employed herein, while the term MEC will occasionally be used to illustrate such examples.

FIG. 1 illustrates an EC system reference architecture, in the form of a MEC network architecture configured according to an embodiment, showing functional elements that comprise the EC system, and the reference points between them.

In a broad context, an EC system comprises one or more EC hosts or servers, which hosts may run or execute EC applications to users, connecting to the EC system through a User Equipment (UE), typically by radio communication. Moreover, the EC system comprises an EC management entity, which is configured to control the EC hosts to instantiate EC applications using one or more services.

For an ETSI MEC system with MEC components, as shown in FIG. 1, there are three groups of reference points defined between the system entities:
  reference points regarding MEC platform functionality (Mp);
  management reference points (Mm); and
  reference points connecting to external entities (Mx).

In accordance with some embodiments, an MEC system may be divided into an MEC system level 100 and an MEC host level 200. The system may comprise one or more MEC hosts 220, 220-2 etc., and MEC management necessary to run MEC applications within an operator network or a subset of an operator network.

The MEC host 220 may be an entity that contains an MEC platform 223 and a virtualization infrastructure 221 which provides compute, storage, and network resources, for the purpose of running MEC applications 228.

The MEC host 220, 220-2, or more generally an EC server or EC host 220, may comprise an MEC platform 223, which is a collection of essential functionalities required to run MEC applications 228, more generally referred to herein as EC applications, on a particular virtualization infrastructure and enable them to provide and consume MEC services. The MEC platform 223 may also provide services. Such services may e.g. include radio network information services, configured to provide authorized EC applications with radio network related information; location services, configured to provide authorized EC applications with location-related information; bandwidth manager services, configured to allow allocation of bandwidth to certain traffic routed to and from EC applications and the prioritization of certain traffic.

EC applications 228 are instantiated on the virtualization infrastructure of the MEC server 220 based on configuration or requests validated by MEC management. The MEC management may comprise MEC system level management and MEC host level management. Further MEC servers 220-2 may form additional EC servers of the system, which may be configured in a corresponding manner as the MEC server 220.

The MEC system level management includes an MEC orchestrator 101 as a core component, which is configured to have an overview of the complete MEC system, and an operations support system 102. The MEC host level management comprises an MEC platform manager 210 and a virtualization infrastructure manager 201 and is configured to handle management of MEC specific functionality of a particular MEC host 220, and the applications 228 running on it.

In an embodiment configured in accordance with the ETSI MEC standard, the system may comprise the following elements or features:

100 Mobile edge system level
101 Mobile edge orchestrator
102 Operations Support System
103 User app LCM proxy
104 CFS portal
105 UE app
200 Mobile edge host level
201 Virtualization infrastructure manager
210 Mobile edge platform manager
211 MEC platform element management
212 MEC app rules & requirements management
213 MEC app lifecycle management
220 Mobile edge server
221 Virtualization infrastructure
222 Data plane
223 Mobile edge platform
224 Traffic rules control
225 DNS handling
226 Service registry
227 MEC service
228 MEC app
229 Service
220-2 Other MEC server
223-2 Other MEC platform In the context of the solutions provided herein, an embodiment set out for MEC may include an EC management entity 300 which includes at least the orchestrator 101, but the EC management entity may also include one or both of the Operations Support System 102 and the mobile edge platform manager 210.

Figure 2:
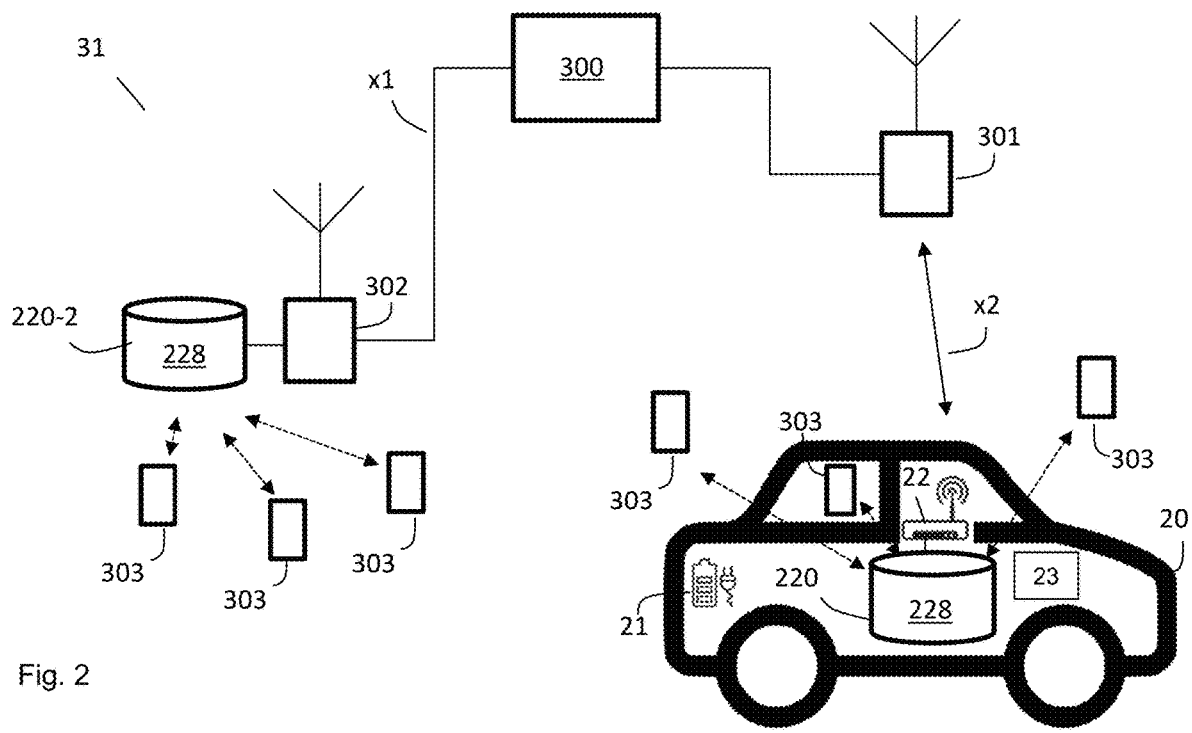
FIG. 2 illustrates a scenario of mobile devices supported by an EC system according to various embodiments.

FIG. 2 schematically illustrates various User Equipment (UE) 303 operating as wireless devices 303 in an EC system 31 connected to a wireless communication network comprising network nodes 301, 302. The wireless communication network may comprise a radio access network, and the network nodes 301, 302 may be radio stations in a cellular arrangement. Such a radio communication network may e.g. be a 3GPP LTE network, in which the network nodes 301, 302 are denoted eNodeB. Furthermore, in a 3GPP NR network, the network node 301, 302 are denoted gNodeB. In an alternative embodiment, the radio communication network may e.g. be a wifi system, such as according to IEEE 802.11. The network nodes 301, 302 may in such a system be denoted access points and are typically not arranged in a cellular arrangement. In various embodiments, various EC servers may be configured to be connectable to UEs using other communication technologies, such as e.g. Bluetooth, LoRa, ZigBee etc.

A first server 220 configured to operate as an EC server, such as a MEC host, is located in a movable node or vehicle 20, such a car. The mobile first EC server 20 is powered by a power source 21, such as a battery of the vehicle 20. The first EC server is further connected to a communication interface 22, operable for communication with network nodes of the wireless communication network, such as a first radio station 301. A second server 220-2 configured to operate as an EC server is connected to a network node, such as a second radio station 302. The second server 220-2 may e.g. be a stationary server, in the sense that it is physically located in a static place, e.g. wire-connected to the second network node 302.

An EC management entity 300 may be configured to control instantiation and relocation of application sessions to and between the EC servers 220, 220-2. With reference to FIG. 1, the EC management entity 300 may e.g. comprise a MEC orchestrator 101 and an operations support system 102, and optionally also a MEC platform manager 210 in various embodiments.

An object of the solutions proposed herein is to provide a solution for power management which not only takes its available current EC application service in to consideration. Specifically, solutions are provided which are configured on the basis of the first EC server being mobile. These are based on inter alia the following considerations:

i) If the mobile EC server 220 is in a dense area, meaning that there are many devices 303 that may require service from an EC server 220, 220-2, the EC server 220 may need to serve many surrounding devices. In case the mobile EC server is in a dormant state prior entering a dense area, a triggering mechanism is needed so that the EC server can serve those devices.

ii) Similarly, once the mobile EC server 220 leaves a dense area and the EC server is not serving any devices, it would be beneficial if the EC server moving node can be in a dormant state to save the power consumption. Here, a mechanism is needed to accommodate that an EC server changes the state from active to dormant state.

iii) If the mobile EC server node finds a nearby stationary EC server, it would be beneficial if the mobile EC server changes the state from active to dormant state and transfer its task/functionality to that stationary EC server.

iv) If the EC server moving node has a low battery level, it would be beneficial if the that EC server mobile node changes the state from active to dormant state and transfer its task/functionality to that stationary EC server.

For these purposes, it is in various embodiments proposed to introduce a central function for handling the control functionality of power save mode/dormant mode to an EC server. When introducing a power save state of an EC server, this also involves signaling in various embodiments to support the following:

Central control signaling for activation/deactivation of the power save state from a management entity 300. This enables the management entity to request a certain power state to be used in the mobile EC server 220 via explicit state request signaling from the management entity 300 to the mobile EC server 220.

Support signaling from mobile EC server 220 to the management entity 300 for the central management of EC server power states. In order to support the function in the bullet above, the management entity 300 may provide rules for the EC server 220 on providing parameter or status reports to the management system. The reports from mobile EC server 220 to the management entity 300 are used by the management entity 300 to determine suitable power states of different EC servers 220, 220-2.

In various embodiments, the management entity 300 may instead of direct power state requests provide rules for the EC server 220 to be used for power state activation/deactivation by the EC server 220. The rules may include triggering criteria/condition for state switching to be used by the EC server 200. Triggers will then be analyzed within the EC server 220. Hence with this functionality the management entity 300 determines the rules for different power states in the EC server 220, while the EC server 220 evaluates the parameters provided in the information and when a trigger occasion occurs the EC server 220 informs the management server.

Support signaling from the management entity 300 to the EC server 220 for the method of power state activation/deactivation by the EC server 220. The management server may provide status information to the EC server 220 which the EC server 220 is using within its evaluation rules for state switching, such as availability, position, mobility, and capacity of other EC servers, including stationary EC servers 220-2.

The overall scenario for the solution of the proposed concept is explained herein with reference to the drawings. FIG. 1 illustrates inter alia the entities that may be used or consider for managing the power state of an EC server 220, such as the EC management entity 300, including e.g. orchestrator, EC platform, EC platform manager etc., other EC servers nearby, and external entities outside the EC system such as e.g. the radio access network (RAN), power supply management systems 21 of the moving node 20, positioning systems 23 etc. The properties and status of these entities may influence whether the EC server 220 should be controlled to enter a dormant state or not and for taking state change decisions. In case an EC server 220 enters a dormant state, this means the EC server 220 is no longer available to host any EC applications 228. Correspondingly, these entities may be used or considered for waking up the mobile EC server 220 from a dormant state.

The proposed functionality also includes new triggering mechanisms of an EC server (possibly moving) node to change its power state from active to dormant (and vice versa). The trigger mechanism can be used for either centralized decisions of EC power states or distributed decisions. For the centralized case the management entity 300 may request an EC server 200 to transfer information to the management entity 300 to have relevant information to take the decision. In the distributed case the management entity 300 is configured to provide information about parameters and rules/trigger criteria for the EC server 220 to take into account for deciding and executing a switch between states. Examples of different triggers may be associated with for example power/battery level for the mobile EC server 220, position information, time, network access status, load level and capacity of the mobile EC server and other EC servers in the system 31, etc.

Figure 6A:
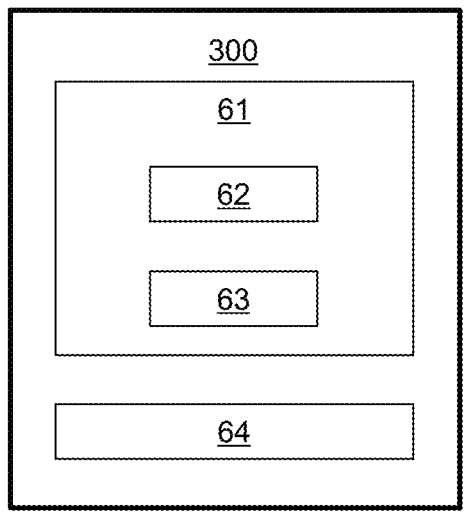
FIG. 6*a* schematically illustrates a device configured to operate as an EC management entity configured to control one or more EC servers to provide application services to user equipment.

Before discussing function and operation, it may be noted that FIG. 6a schematically illustrates an embodiment of an EC management entity 300 of an EC system 31. The EC management entity 300 comprises control circuitry 61 being configured to carry out the method steps of any of the embodiments outlined herein. The control circuitry 61 may comprise one or more processors 62, and memory storage 63 for storing computer code, such as a non-volatile memory, which code the processor 62 is configured to execute to carry out the methods presented herein. The management entity 300 may further comprise at least one interface 64, for communicative control signaling with at least one EC server 220 of the EC system.

Figure 6B:
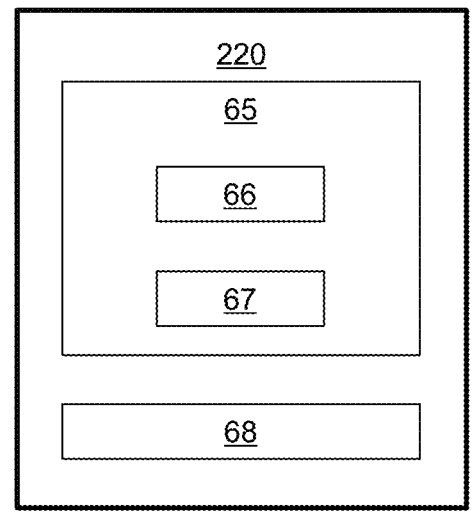
FIG. 6*b* schematically illustrates a device configured to operate as a mobile EC server for hosting an application run by a UE according to various embodiments.

Moreover, FIG. 6b schematically illustrates an embodiment of a mobile EC server 220 of an EC system 31. The mobile EC server 220 comprises control circuitry 65 being configured to carry out the method steps of any of the embodiments outlined herein. The control circuitry 65 may comprise one or more processors 66, and memory storage 67 for storing computer code, such as a non-volatile memory, which code the processor 66 is configured to execute to carry out the methods presented herein. The mobile EC server 220 may further comprise or be connected to at least one interface 68, corresponding to interface 22 of FIG. 2, for communicative control signaling with at least the EC management entity 300, and for communication with UEs 303.

Figure 5:
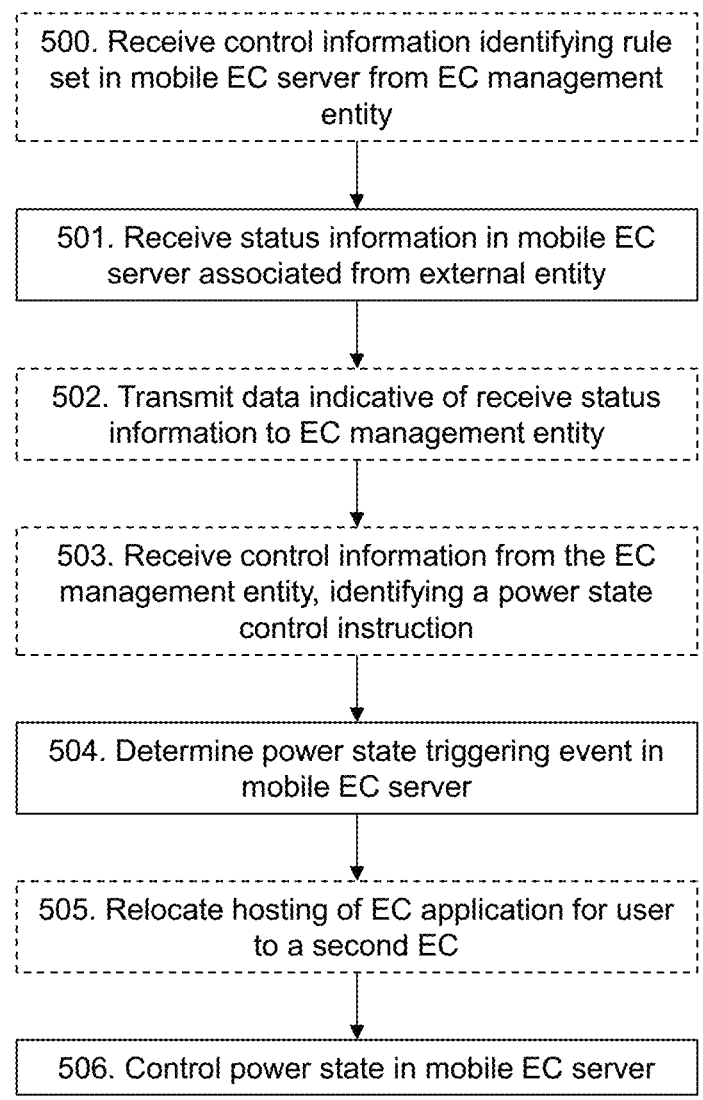
FIG. 5 schematically illustrates a method carried out in a mobile EC server in accordance with an embodiment.

FIG. 5 describes various steps of different embodiments of a method according to the invention. This relates to method for controlling operation of a mobile first EC server 220 configured to provide compute resources to one or more UEs 303, and the method is carried out in the mobile first EC server 220. The mobile first EC server 220 is connected to an EC management entity 300 configured to manage a plurality of EC servers 220, 220-2. In a broad context, the method comprises Receiving 501 status information associated with the first EC server from an external entity.

Determining 504 a power state triggering event, based on the received status information.

Controlling 506 the power state of the first EC server responsive to the determined power state triggering event.

By means of this method, a mobile EC server 220 may be effectively controlled to assume a certain state, or change state, based on relevant information other than just whether or not it is currently used for an application service.

The external entity may for instance include a power source for the mobile EC node 220, such as a power state of a power source 21 of a moving node or vehicle 20 carrying the mobile EC server 220. The status information may thus for instance be associated with a predefined power state of the mobile first EC server 220.

In some embodiments, the external entity may include a positioning entity 23, and the status information may for example include position information for the mobile first EC server 220, and/or of another EC server 220-2, and/or of a UE 303 running or requesting to run an EC application 228.

In some embodiments, the external entity may include a communication interface 22, such as a radio transceiver, operable by the mobile EC server 220 to communicate with one or more of UEs 303, and with the EC management entity and/or other EC servers 220-2 over a communication network. The status information may for example include signal strength level or quality of service QoS parameters, related to such communication.

In various embodiments, the step of determining the triggering event may include applying a location-based rule set, identifying a power state for at least one defined location. The rule set may e.g. include a predetermined power state, such as dormant or active, to a certain location, such as a region or a geofence. In some embodiments, the rule set may be stored in memory storage 67 in the mobile EC server 220.

In various embodiments, the method may include receiving 500 control information as a message identifying said rule set from the management entity. This message may include location data, and possibly power state information associated with the location data. Alternatively, the message may include location data without identification of power state, whereas the EC server 220 is configured to automatically interpret such received location information as associated with a predetermined power state, such as a dormant state.

These embodiments provide distributed decision-making, such that the mobile EC server 220 may decide and enter a certain power state without being directly instructed to do so by the EC management entity 300. In such embodiments, the triggering event may thus be determined as a request for the first EC server 220 to assume the identified power state based on a position of the first EC server relative to said defined location.

In one variant of such an embodiment, the triggering event is determined as a request for the first EC server 220 to assume an active state, responsive to determining that the first EC server 220 is present in or enters said defined location, or leaves said location.

In another variant, the triggering event is determined as request for the first EC server 220 to assume a dormant state, responsive to determining that no application 228 is currently hosted for any UE 303 in the first EC server 220 and that the first EC server 220 is present in or enters said defined location, or leaves said location.

In some embodiments, where the state triggering event is determined as a request for the first EC server to enter a dormant state, the method may further comprise
    relocating 505 hosting of an EC application for a user of a UE 303 to a second EC 220-2, prior to controlling 506 the power state of the first EC server to dormant state.

As opposed to distributed decision-making for setting the power state in the mobile EC server 220, or as a complement to such a solution, the EC server 220 may be configured to obtain direct power state control from the EC management entity 300. In such an embodiment, the mobile EC server 220 may be configured to
    transmit 502 data, indicative of at least the received status information, to the EC management entity 300. Determining a power state triggering event may thus include receiving 503 control information as a message from the EC management entity 300, which message is indicative of a power state request for the first EC server.

In some embodiments, the data transmitted 502 may thus include information, indication or metric of one or more of the aforementioned types of information for the mobile first EC server 220, such as power or charge level, position or location data, signal strength level or quality of service QoS parameters, EC load level, etc.

In one embodiment, the message may identify a second EC server 220-2 and a request to relocate hosting of an EC application 228 for a user of a UE 303 between the first 220 and second 220-2 EC server.

Specifically, in one embodiment, said message comprises a request to relocate the user of a UE 303 to the mobile first EC server 220 from the second EC server 220-2, wherein the power state triggering event is determined as an instruction to enter an active state.

Figure 7:
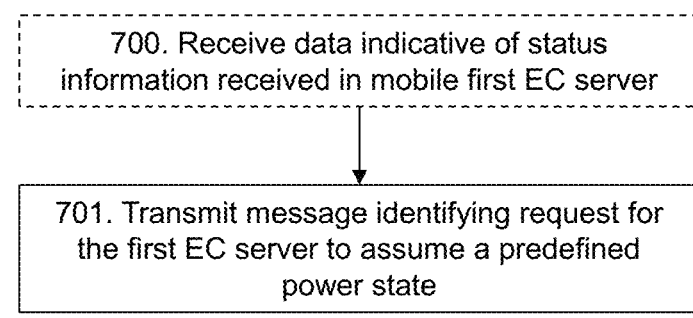
FIG. 7 illustrates a method carried out in an EC management entity in accordance with an embodiment.

Referring now to FIG. 7, corresponding to the embodiments carried out the mobile EC server 220, various embodiments are carried out in the EC management entity 300, configured to manage a plurality of EC servers 220, 220-2, for handling power states of at least the mobile first EC server 220. Such an embodiment may comprise
    transmitting 701 a message to the mobile first EC server, wherein said message is configured to identify a request for the first EC server to assume a predefined power state based on status information received in the mobile first EC server.

In some embodiments, said message may include a location-based rule set, identifying a power state for at least one defined location. Such an embodiment provides for distributed decision-making, such that the mobile first EC server 220 may determined and execute a change of power state without direct execution control by the management entity 300.

In one embodiment, the message may identify a request for the first EC server 220 to assume a dormant state, responsive to determining that no application is hosted in the EC server 220 for any UE and that the first EC server 220 is present in or enters said defined location, or leaves said location.

In various embodiments, the message may identify a second EC server 220-2 and a request to relocate hosting of an EC application 228 for a user of a UE 303 between the first 220 and second 220-2 EC server.

Relocation of hosting may be carried out by the application 228 and may include sending user context.

As noted in FIG. 7, the method carried out in the management entity may comprise receiving 700 data from the mobile first EC server 220, which data is indicative of status information received in the mobile first EC server. The received 700 data may include information, indication or metric of one or more of the aforementioned types of information for the mobile first EC server 220, such as power or charge level, position or location data, signal strength level or quality of service QoS parameters, EC load level, etc. In such an embodiment, direct decision-making by the management entity 300 may be employed instead of or in addition to distributed decision-making. The management entity 300 may thus be configured to transmit 701 said message to the mobile first EC server 220 based on the received data, so as to control the mobile first server 220 to assume a predetermined power state, such as a dormant state or an active state.

Some embodiments will now be described with reference to FIGS. 3 and 4 for more specific examples, which fall within the scope discussed above.

Figure 3:
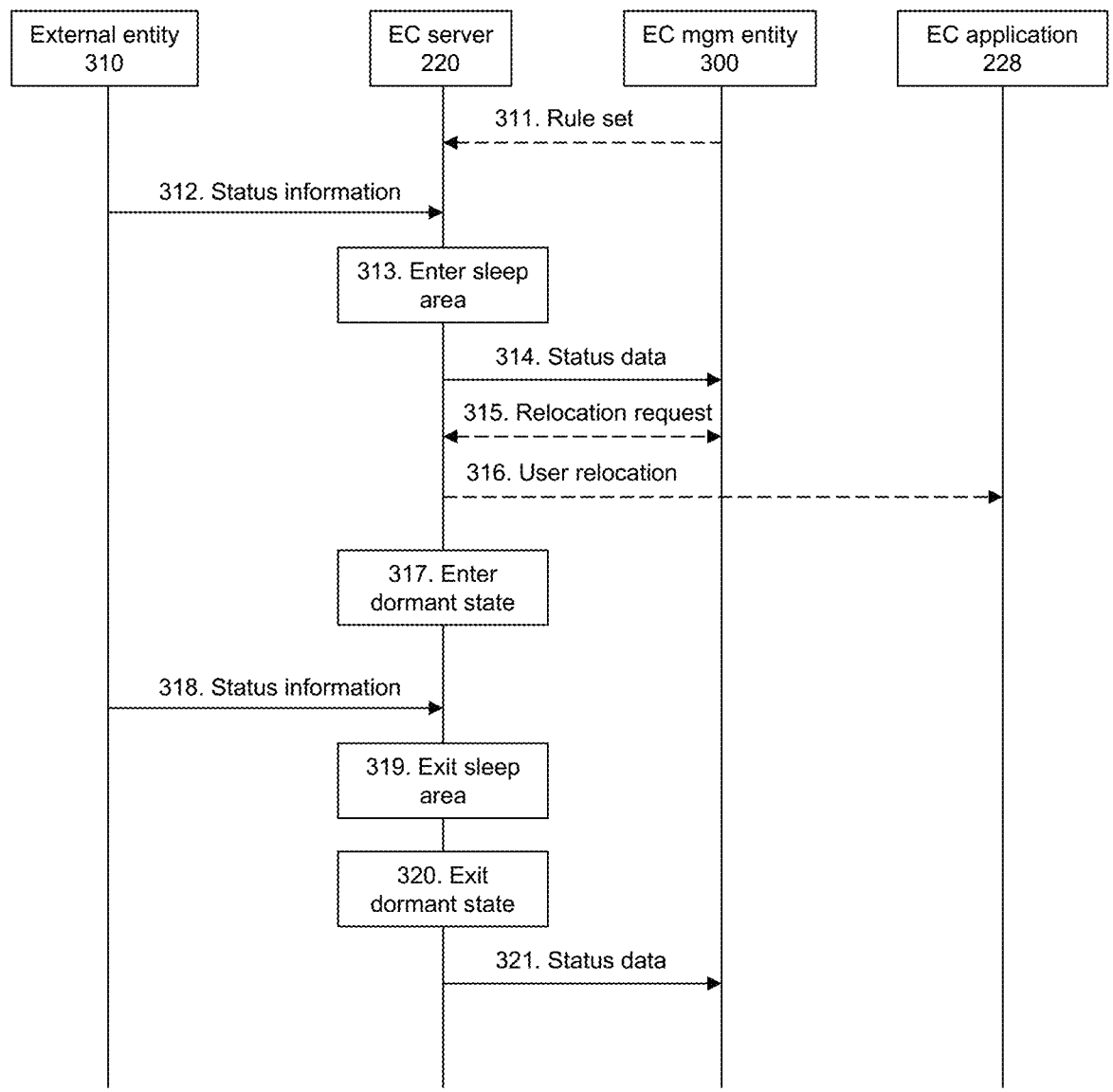
FIG. 3 schematically illustrates a signal diagram in one embodiment of an EC system including a mobile EC server.

Referring to FIG. 3, an example of a signaling diagram is shown for various embodiments, where an external entity as mentioned above triggers the mobile EC server 220 to assume a certain power state, such as to enter/exit a dormant state. The external entity may for example be one or more of a RAN node, a positioning device 23 such as a position estimation unit (e.g. GPS receiver), a power supply device 21, etc. In this example embodiment, the status information includes at least position data related for the present, or a predicted, location of the mobile first EC server 220.

As noted also with reference to FIG. 5, control information comprising a rule set 311 may be transmitted from the EC management entity 300 for receipt 500 in the mobile first EC server 220. Alternatively, the rule set may be wholly or at least partly pre-coded in the EC server 220.

Status information including the position data 312 is received or obtained in the mobile first EC server 220, such as location (e.g. obtained from GPS) update reporting of the current location obtained from a positioning device 23.

The obtained position, included in or determined from the received status information 312, is compare or correlated with a location data of the rule set 311. In this example the position is determined to correlate with a "sleep" area. A location may e.g. be defined as a sleep area or location based on existence of a stationary EC server 220-2, or of another mobile EC server, in that area.

Correlation of the obtained position with the rule set is thus interpreted a power state triggering event for the EC server 220 to assume or enter 313 a dormant state.

The mobile EC server 220 sends status data 314 to inform the management entity 300 that it will enter dormant state.

If the mobile EC server 220 is currently providing an application service to a user of a UE 303, the status data 314 may initiate a relocation of such a user. This may involve the EC server 220 requesting 315 the management entity 300 or the EC application 228 to relocate its users, or the EC management entity controlling the EC server 220 to relocate its users. The concept of relocating a user involves relocating user context.

In this example, The EC application 228 is controlled from the mobile EC server 220 to relocate 316 its users to another EC server in the present location area.

Once user context for all application instances in the mobile first EC server 220 are relocated, the mobile first EC server 220 enters a dormant state 317. In this context, a dormant state may imply shutting off or inactivating resources for computation, while maintaining the possibility to receive status information 312, 318, and possibly control signals from the EC management entity 300, such as paging signals sent through an access node 301 of the wireless network.

At some instance, new status information 318 is received, indicating a new location. By correlation with the rule set 311, the mobile first EC server 220 may thereby be triggered to exit a dormant state 320.

The mobile first EC server 220 preferably also sends status data to inform the EC management entity 300 of its availability.

The EC management entity 300 thus keeps track of EC servers and their availability, both when EC servers 220 initiate state switching and informs the EC management as well as by the EC management 300 controlled state switching of a mobile EC server 220. This allows e.g. the management system to inform EC servers, such as stationary EC servers 220-2, when a nearby mobile EC server 220-2 wakes up and becomes available.

Figure 4A:
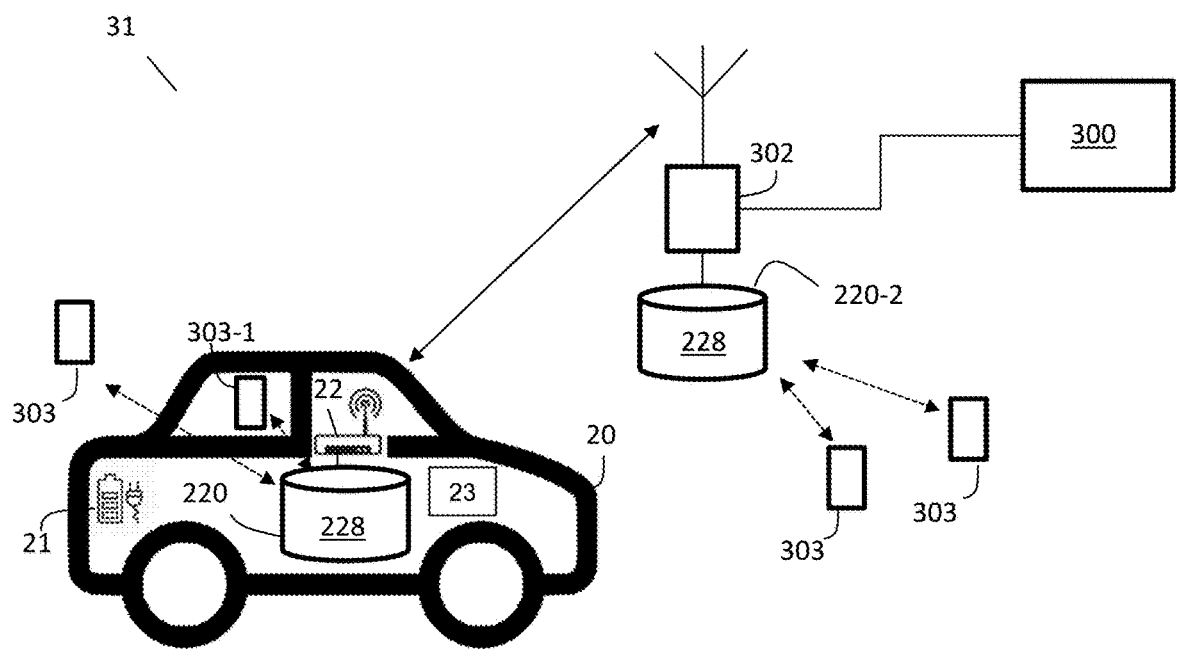
FIG. 4*a* illustrates a scenario of a mobile EC server in an area covered by a stationary EC server according to various embodiments.

FIG. 4a shows another example embodiment, which provides a specific example which is also usable for understanding other broader elements of the invention as outlined. In this scenario, a mobile EC server 220 carried in a moving node or vehicle 20 is present in a cell where there is an access node 302 which has a connected stationary or static EC server 220-2. This stationary EC server 220-2 is typically a high capacity EC server, e.g. configured as a MEC host. Some users may be relocated from the stationary EC server 220-2 to the mobile EC server 220, and vice versa, depending on status information such as battery status of power supply 21, location (and mobility) of the mobile first EC server 220.

Figure 4B:
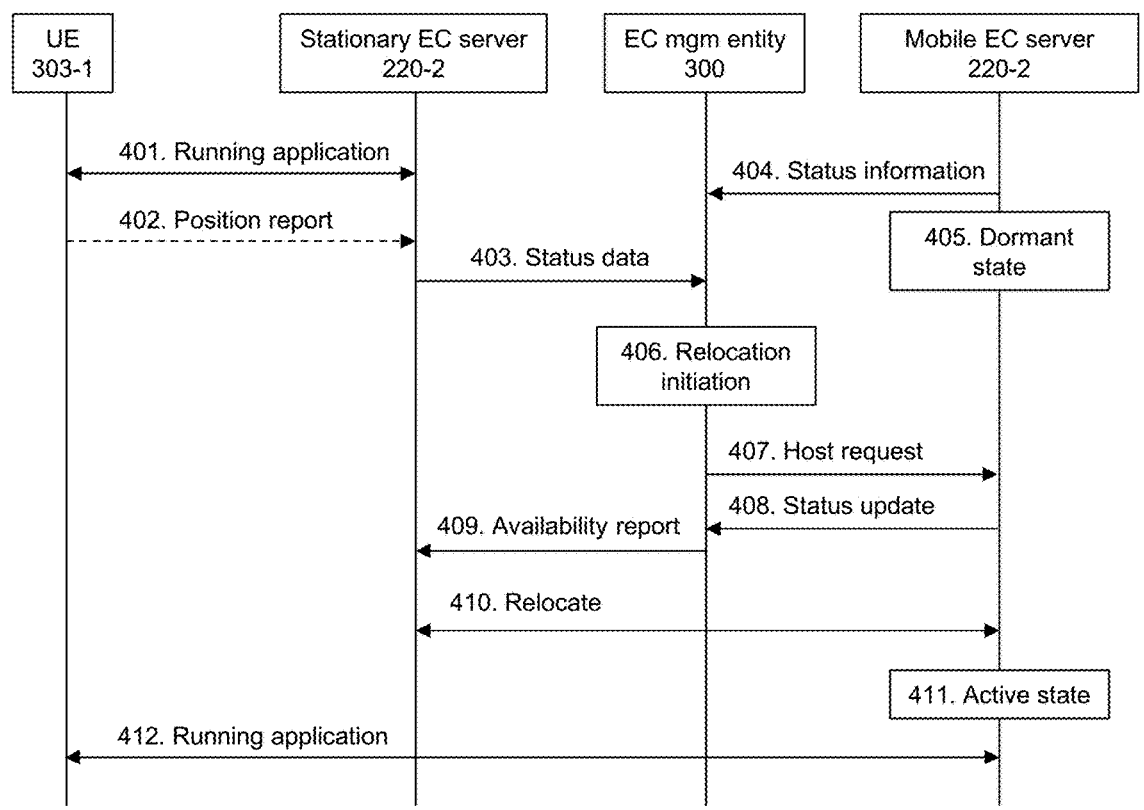
FIG. 4*b* schematically illustrates a signal diagram in various embodiment in a scenario of FIG. 4*a*.

FIG. 4b illustrates a signaling diagram illustrating the mechanism of changing of the power state of mobile EC server 220 from dormant to active and also the process of relocating of UEs. This represents a scenario wherein UEs 303-1 and the mobile EC server 220 are moving together, e.g. same car/train, and both are relatively moving away from the stationary EC server 220-2.

In the example of FIGS. 4a and 4b, a user is running 401 an application using an EC application service 228 to support the user's in UE 303-1. The user is in or near a vehicle 20. Even though the vehicle 20 incorporates a mobile first EC server 220, the EC system 31 may be configured to promote use of the stationary EC server 220-2 at least as long as there is no movement of the mobile first EC server 220, since the stationary EC server 220-2 normally has higher capacity and is nevertheless less affected by power consumption.

The mobile EC server 220 may provide status information 404 to the EC management entity 300, either upon request by the EC management entity 300 or repetitively with a certain period. The status information may e.g. indicate position, battery level, load (such as number of IP connections) etc. of the mobile EC server 220. In the example embodiment, the mobile EC server 220 is in a dormant state 405.

The EC management entity be configured to send an availability report (not shown) to the mobile EC server 220, and potentially also to the stationary EC server 220-2, when it is determined that they are present in a common area, so as to inform the EC servers of their present co-location.

At some point, the user is or starts travelling in the vehicle 20, which causes obtainment of status information including position data. The position information may be obtained using a position estimation unit (e.g. GPS receiver) in the user's UE 303-1. The UE 303-1 transmits a position report 402 to the stationary EC server 220-2 to which it is connected. This may be carried out on request by the serving EC server 220-2, or triggered by detection of movement in the served UE 303-1.

The stationary EC server 220-2 provides status data 403 to the EC management entity 300, which status data indicates the mobility of the UE 303-1. The status report may include raw data received from the UE 303-1, or data processed in the stationary EC server 220-2 to indicate more specific or detailed information.

Based on the status data 403 associated with the UE 303-1 of the user running an EC application in the stationary EC server 220-2, and on received status information 404, the EC management entity may determine that the UE 303-1 and the mobile EC server 220 are moving substantially in the same direction and with a common speed, indicating that they are carried in a common vehicle 20. This may cause the EC management entity 300 to initiate relocation of the user of UE 303-1.

The EC management entity 300 may transmit a host request 407 to the mobile EC server 220. This may indicate or be interpreted in the mobile EC server 220, as a request to exit the dormant state. The host request 407 may also indicate requirements of the UE 303-1 with regard to the application 228 it is running in the stationary EC server 220-2. At least in a case where the mobile EC server 220 is already in an active state, the host request 407 may include a request for the mobile EC server 220 to indicate present capacity information, such as number of currently served users, a degree of used available compute resources, power level etc.

The mobile EC server may thus be triggered to report back with a status report 408, and may thereby be triggered to exit, or prepare for exit of, the dormant state.

The availability of the mobile EC server 220 to take over hosting of the application for the user of UE 301-1 may then be reported 409 from the EC management entity 300 to the serving EC server 220-2. This availability reporting may also involve an instruction to initiate relocation 410 of the user of UE 303-1.

The mobile EC server 220 is then, if not already, set into an active state 411, and is thereafter acting as serving host for running 412 the application 228.

The proposed embodiments provide a central coordinated function for handling power states of a mobile EC server. In various embodiments, triggering for different power states is based on the following items its own power supply conditions and on location of a mobile EC server relative to any other mobile/stationary EC servers. The mobile EC server may be configured or have access to a database with sleep areas. One example of such implementation could be a managed server, which may be connected to the EC management entity 300, which indicates the edge computing relative needs in different geographical areas. This may as one example be implemented by specifically indicating certain sleep areas where mobile EC servers are not required to operate. These sleep areas for example could already be served by known stationary EC servers. Another alternative is that strong computing need in a specific area may trigger the mobile EC server to wake up.

Various embodiments have been disclosed in the foregoing, related to the proposed concept of management of mobile edge computing servers. Unless clearly contradictory, such embodiments may be combined in any way.

The invention claimed is:

1. A method for controlling operation of a mobile first Edge Computing (EC) server carried in vehicle, and that is configured to provide compute resources to User Equipment (UE), wherein the first EC server is connected to an EC management entity configured to manage a plurality of EC servers, the method being carried out in the first EC server and comprising:
receiving status information that includes position data indicating a location of the first EC server from an external entity that includes a positioning device that is part of the vehicle that carries the first EC server;
receiving control information from the EC management entity, said control information identifying a power state control instruction;
determining a power state triggering event in accordance with the power state control instruction, based on the position data;
controlling the power state of the first EC server responsive to the determined power state triggering event.

2. The method of claim 1, wherein said external entity further includes a power source of the first EC server and wherein said information includes data indicative of a charge level.

3. The method of claim 1, wherein the power state control instruction comprises a location-based rule set, identifying a power state for at least one defined location, and wherein determining the triggering event includes applying the location-based rule set.

4. The method of 3, wherein the triggering event is determined as a request for the first EC server to assume the identified power state based on a position of the first EC server relative to said defined location.

5. The method of claim 3, wherein the triggering event is determined as a request for the first EC server to assume an active state, responsive to determining that the first EC server is present in or enters said defined location, or leaves said defined location.

6. The method of claim 3, wherein the triggering event is determined as a request for the first EC server to assume a dormant state, responsive to determining that no application is hosted for a UE in the first EC server and that the first EC server is present in or enters said defined location, or leaves said defined location.

7. The method of claim 1, wherein the state triggering event is determined as a request for the first EC server to enter a dormant state, the method further comprising:
relocating hosting of an EC application for a user of a UE to a second EC, including relocating user context, prior to controlling the power state of the first EC server to dormant state.

8. The method of claim 1, comprising:
transmitting data, indicative of at least the received status information, to the EC management entity,
wherein the control information is received responsive to the transmitted data, and wherein said power state control instruction is indicative of a power state request for the first EC server.

9. The method of claim 8, wherein said message identifies a second EC server and a request to relocate hosting of an EC application for a user of a UE between the first and second EC server.

10. The method of claim 9, wherein said message comprises a request to relocate the UE to the first EC server from the second EC server, wherein the power state triggering event is determined as an instruction to enter an active state.

11. The method of claim 8, wherein the data is indicative of an EC load level of the first EC server.

12. An Edge Computing (EC) server configured to provide compute resources to a User Equipment (UE) for an application service under control of an EC management entity for managing a plurality of EC servers, the EC server comprising logic configured to carry out the steps according to claim 1.

13. A method, carried out in an Edge Computing (EC) management entity configured to manage a plurality of EC servers, for handling power states of at least a mobile first EC server carried in a vehicle, the method comprising:
transmitting a message to the mobile first EC server,
wherein said message comprises control information identifying a power state control instruction, configured to identify a request for the first EC server to assume a predefined power state based on position data received in the mobile first EC server from an external entity that includes a positioning device that is part of the vehicle that carries the mobile first EC server.

14. The method of claim 13, wherein said message includes a location-based rule set, identifying a power state for at least one defined location.

15. The method of claim 14, wherein said message identifies a request for the first EC server to assume a dormant state, responsive to determining that no application is hosted for a UE and that the first EC server is present in or enters said defined location, or leaves said defined location.

16. The method of claim 13, wherein said message identifies a second EC server and a request to relocate hosting of an EC application for a user of a UE between the first and second EC server.

17. The method of claim 13, comprising:
receiving data from the mobile first EC server, indicative of position data received in the mobile first EC server;
transmitting said message to the mobile first EC server based on the received data.

* * * * *